United States Patent [19]

Nardozza et al.

[11] 4,313,207

[45] Jan. 26, 1982

[54] METHOD AND SYSTEM FOR SELECTIVELY DISRUPTING RADIO TELEGRAPH COMMUNICATIONS

[75] Inventors: Vincent J. Nardozza, Rome; Marvin R. Clinch, Oneida, both of N.Y.

[73] Assignee: The United States of America as represented by the Secretary of the Air Force, Washington, D.C.

[21] Appl. No.: 616,423

[22] Filed: Feb. 10, 1967

[51] Int. Cl.[3] .......... G01S 7/36

[52] U.S. Cl. .......... 455/1; 375/2.1; 343/18 E

[58] Field of Search .......... 343/18 E; 325/21, 22; 455/1, 18; 375/2, 4, 21, 22

[56] References Cited

U.S. PATENT DOCUMENTS

| | | | |
|---|---|---|---|
| 2,440,253 | 4/1948 | Dodington | 343/18 E |
| 2,703,881 | 3/1955 | Bergemann et al. | 343/18 E |
| 2,931,031 | 3/1960 | Deloraine et al. | 343/18 E |
| 2,943,318 | 6/1960 | Deloraine et al. | 343/18 E |
| 2,957,170 | 10/1960 | Haughawout | 343/18 E UX |
| 2,978,699 | 4/1961 | Dodington | 343/18 E |
| 2,989,744 | 6/1961 | Pettit | 343/18 E |
| 3,015,096 | 12/1961 | Deloraine et al. | 343/18 E |
| 3,019,433 | 1/1962 | White | 343/18 E |
| 3,983,482 | 9/1976 | Doherty | 455/18 |
| 4,214,208 | 7/1980 | O'Donnell | 455/1 |
| 4,219,891 | 8/1980 | Weiss et al. | 455/1 |

*Primary Examiner*—Howard A. Birmiel
*Attorney, Agent, or Firm*—Donald J. Singer; Sherman H. Goldman

[57] ABSTRACT

A method and system for disrupting discrete keyed continuous wave radio communications wherein the discrete keyed continuous wave communications signal conveys intelligence by virtue of the duration and spacing of a coded series of characters by insertion of additional character representing signals within the spaces between the characters of the original signal, thereby changing the coded series and thus depriving the intended recipient of the original intelligence.

5 Claims, 2 Drawing Figures

METHOD AND SYSTEM FOR SELECTIVELY DISRUPTING RADIO TELEGRAPH COMMUNICATIONS

The invention described herein may be manufactured and used by or for the United States Government for governmental purposes without payment to us of any royalty thereon.

This invention relates to a method and system for disrupting radio telegraph communications and more particularly to a method and system to selectively disrupt discrete keyed continuous wave and modulated continuous wave radio communications.

This invention provides the capability to selectively disrupt discrete keyed continuous wave (CW) and modulated continuous wave (MCW) radio communications circuits, while retaining the ability of the party responsible for the disruption (the disrupter) to extract the intelligence impressed upon the signal by its originator. A keyed C.W. or M.C.W. signal conveys intelligence by virtue of the duration and spacing of a coded series of characters. This invention provides a means of inserting "extra" characters within the spaces between the characters of the original signal, thereby changing the coded series and thus depriving the intended recipient of the original intelligence. The disruptor, however, having knowledge of when the inserted characters occurred, retains the capability of extracting the original intelligence from the disrupted signal.

In accordance with this invention there is provided a radio receiver, transmitter and logic chassis. The receiver and transmitter are tuned to the frequency of the signal to be disrupted. At the end or on the "trailing-edge" of an intercepted character, the logic chassis initiates a selectable time delay which determines the spacing interval between the intercepted character and the character to be inserted into the original signal. At the end of this delay period, the receiver is "turned-off" and the transmitter is "turned-on". The period of time for which the transmitter is "on", or the duration of the inserted character is determined by a second selectable time delay generated in the logic chassis. At the end of this delay period, the transmitter is "turned-off" and the receiver is returned to the "on" condition. The receiver is "turned-off" or blanked during the transmission of the inserted character, to prevent the embodiment (radio receiver, transmitter and logic chassis) from entering into a regenerative state (i.e. triggering on its own transmitted characters). A degree of "read-through" (the ability to extract the original intelligence from the disrupted signal) capability is also obtained through blanking, since the receiver does not sense the inserted characters.

The invention enables the user to selectively disrupt discrete hand keyed CW and MCW communications circuits through the random addition of disruptive characters to the message content on the circuits operating frequency. No other circuits are effected by the operation of the invention. Further the invention provides for the insertion of disruptive characters which, through selective pulse width and delay, are formed to resemble characters within the original signal (the signal being disrupted). Still further the signals generated by the invention are such that the intended recipient cannot readily identify the inserted characters as being foreign to the original signal. The signals generated by the invention are such that the cause of the distortion upon the disrupted signal could be interpreted by the intended recipient as having resulted from operational errors, coding errors, equipment malfunctions, or signal propagation conditions (ionospheric, atmospheric or terrain). The signals generated by the invention are such that random characters inserted within code groups (word) will not only alter the meaning of those code groups, but through the destruction of the originator's "sending-rhythm", will also make it difficult if not impossible for the intended recipient to recognize character and group spacings in the following portions of the message. Relatively few inserted characters are, therefore, required for effective operation. The invention requires the signal level of the inserted characters at the intended recipient's receiver need only match or slightly exceed the level of the original signal characters to be effective. The required radiated power of the disrupting transmitter is, therefore, relatively low compared to power required by conventional jamming techniques. The bandwidth required by this invention is significantly less than conventional techniques because pulse widths employed are identical to the signal being disrupted. The vulnerability of this invention to detection by the receiving station of the communications circuit being disrupted is lower than that of other techniques. The invention provides the capability for the disruptor to extract the original intelligence from the disrupted signal, (read-through). Finally, the invention allows the disruptor to provide "read-through" capability to other receiving sites by providing real time or relative time synchronization with the inserted characters.

This invention solves the problem of selectively disrupting (with electromagnetic radiation) discrete hand keyed CW and MCW communication circuits in such a manner that: (a) The intended recipients are denied useful intelligence from the disrupted signals. (b) The party responsible for the disruption has a capability to recover the original intelligence from the disrupted signals. (c) Effective disruption is accomplished with a minimum amount of radiated power and signal bandwidth. (d) The cause of the disruption could reasonably be attributed to unintentional sources. (e) The detection of the disrupting signal for ECCM purposes would be extremely difficult.

This invention may be used to exert influence over the signal traffic handled by enemy communications circuits. Through appropriate control over the degree of disruption imparted upon the enemy signals, this invention would permit the user to selectively deny the enemy of communications intelligence and/or to prolong the enemy circuits operating time. The latter would provide additional time in which to employ other ECM techniques against the enemy's communications circuits and/or to initiate physical action against the enemy transmitter sites.

An object of the present invention is to provide a method and system for radio telegraph communication which selectively disrupt discrete keyed continuous wave and modulated wave radio communications through the random addition of disruptive characters to the message content.

Another object of the present invention is to provide a system of radio telegraph communications disruption wherein extra characters are inserted within spaces between characters of the original signal thus changing the coded series to deprive the intended recipient of the original intelligence.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described a preferred embodiment of the invention.

Figure 1:
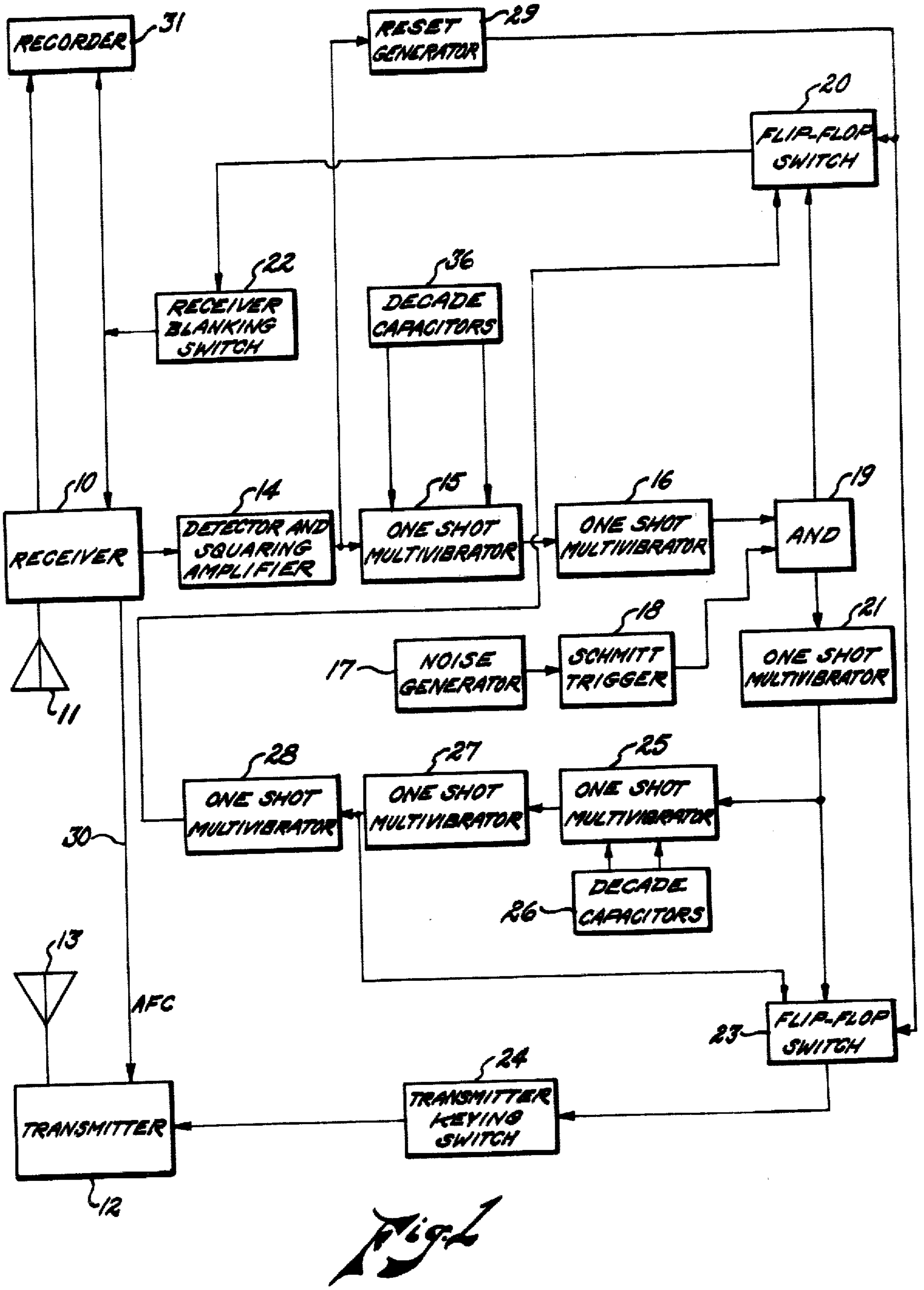
FIG. 1 is a block diagram of a preferred embodiment of the invention.

Now referring in detail to FIG. 1 there is shown normally on receiver 10 connected to its associated antenna 11 and normally off transmitter 12 connected to its associated antenna 13. Receiver 10 is arranged to be gated off and transmitter 12 to be gated on. Receiver 10 is fed radio telegraph signals by way of antenna 11. The output of receiver 10 (I.F. output for continuous wave or audio output for modulated continuous wave) is fed to detector and squaring amplifier 14 for shaping of the received radio telegraph characters or pulses. One shot multivibrator 15 initiates a time delay (Δ) on the trailing-edge of the shaped pulses. This delay can be varied by the selection of an appropriate capacitance from decade capacitor 36 which is arranged and connected with one shot multivibrator 15 to permit a switching change of the capacitance therein which determines the delay thereof. This delay determines the time separation between the trailing-edge of the received pulse and the leading-edge of the disruptive pulse. The trailing-edge of the pulse from one shot multivibrator 15 initiates a pulse from one shot multivibrator 16.

To prevent the intended recipient from sensing a fixed relationship between the original signal characters and the disruptive characters, a random nature is imparted upon the occurrence of the disrupting pulses by multiplying the output of one shot multivibrator 16 with a random noise source output.

Noise generator 17 produces a series of short duration voltage transients which are random in both amplitude and occurrence. Adjustment of the threshold level of Schmitt trigger 18 controls the random rate of the output pulses of the Schmitt trigger i.e. at low threshold levels the Schmitt trigger will fire more frequently. When the outputs of one shot multivibrator 16 and Schmitt trigger 18 are in coincidence, AND gate 19 generates an output pulse. This pulse triggers flip-flop multivibrator 20 and one shot multivibrator 21.

Flip-flop multivibrator 20 when set by the trailing-edge of the pulse from AND gate 19, turns on receiver blanking switch 22 which turns receiver 10 off, i.e. prevents any signal reception.

One shot multivibrator 21 also triggered by the trailing-edge of the pulse from AND gate 19, generates a small delay ($\Delta R_1$) sufficient to allow receiver 10 to turn completely off before transmitter 12 is turned on. The trailing-edge of the pulse from one shot multivibrator 21 sets the transmitter flip-flop multivibrator 23. The output of flip-flop multivibrator 23 turns on transmitter keying switch 24 which turns on transmitter 12.

One shot multivibrator 25 is also triggered by the pulse from one shot multivibrator 21. This one shot multivibrator determines the width of the disrupting pulse. This pulse width is controlled by selection of the appropriate capacitance from decade capacitor 26. Decade capacitor 26 is interconnected with one shot multivibrator 25 to enable a variation of the capacitance which determines pulse width.

One shot multivibrator 27 receives the output from one shot multivibrator 25 and in turn provides an output which resets transmitter flip-flop multivibrator 23 causing transmitter 12 to turn off. One shot multivibrator 28 receives the output from one shot multivibrator 27 and initiates a short delay ($\Delta R_2$) sufficient to allow transmitter 12 to turn completely off prior to the turn on of receiver 10. The trailing-edge of flip-flop multivibrator 28 resets flip-flop multivibrator 20 which turns on receiver 10 through blanking switch 22.

To prevent receiver 10 from turning off and transmitter 12 from turning on during the reception of a pulse by receiver 10, an inhibit circuit is included in the logic. The output of detector and squaring amplifier 14 causes reset generator 29 to hold both flip-flop multivibrators 20 and 23 in the reset state, i.e. receiver 10 on and transmitter 12 off.

Figure 2:
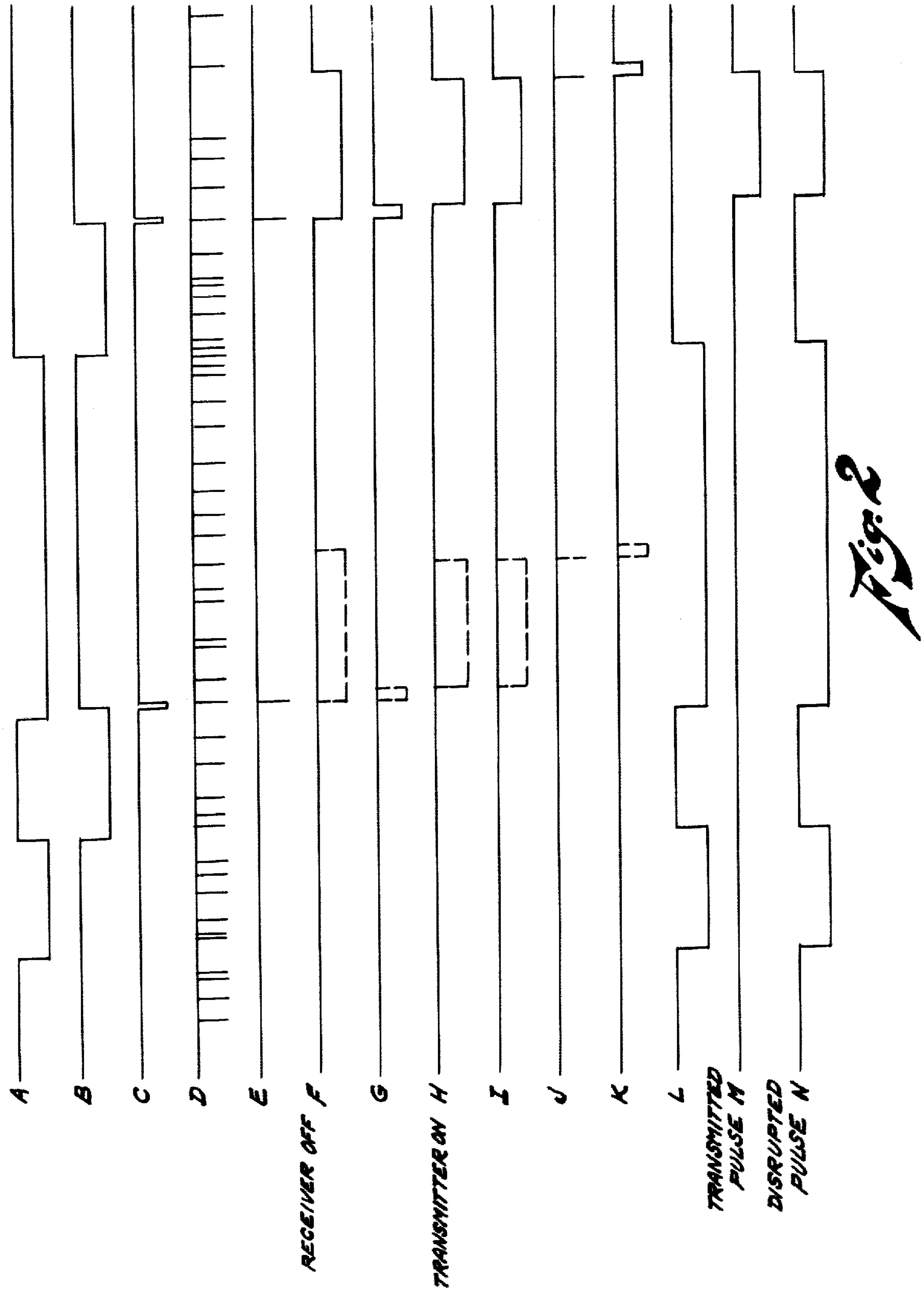
FIG. 2 is the timing diagram for the embodiment shown in FIG. 1.

Now referring to FIG. 11, the timing diagram for the embodiment shown in FIG. 1, shows the relative duration of pulses generated within the logic in response to a received pulse. The received pulses shown at FIG. 2A constitute the International Morse Code Letter A, a dot and a dash. On the trailing-edge of both the dot and dash, a selectable delay is generated as illustrated at FIG. 2B. The trailing-edge of the delay then generates a relatively narrow pulse as illustrated in the waveform of FIG. 2C. The pulse shown at FIG. 2C and the random output of Schmitt trigger 18 as shown at FIG. 2D are multiplied in AND gate 19 whose output is represented by the waveform shown at FIG. 2E. (The timing diagram shows an output at FIG. 2E for each pulse shown at FIG. 2C. This would not be considered normal because of the random rate shown at FIG. 2D. Coincidence, however, in both cases have been shown to illustrate the inhibiting features below). The pulses shown in FIG. 2E would normally set flip-flop multivibrators 20 and 23, (as shown in the waveforms of FIGS. 2F and 2H, respectively), in both instances, but since reset generator 29 will inhibit the flip-flop generators 20 and 23 during the duration of dash pulse shown in FIG. 2A, the pulses are not generated as indicated in FIGS. 2F, 2G, 2H, 2I, 2J, and 2K after receipt of the dot character (see broken lines of FIGS. 2F through 2K). Following the delay after the second (dash) character, there is no signal present at receiver 10. Receiver 10 is turned-off by the waveform shown in FIG. 2F, and transmitter 12 is turned-on, by the waveform indicated in FIG. 2H. Following the delay of pulse width equal to the waveform of FIG. 2K, receiver 10 is turned on. The addition of the waveforms of FIG. 2M, the received signal and the waveforms of FIG. 2M, the transmitted disruptive character, results in the intended recipient seeing the International Morse Code Letter R (dot-dash-dot) as indicated in the waveform of FIG. 2N.

The disrupting signal must be radiated at the same frequency as that of the signal to be disrupted. To guarantee that the signals are not separated by frequency and thus distinguishable to the intended recipient, an automatic frequency control (AFC) circuit is incorporated. Receiver 10 is fitted with a conventional AFC circuit which generates a conventional closed loop servo signal. If either the receiver signal or the receiver local oscillator drifts, the AFC circuit generates an error signal which causes the voltage controlled oscillator of the receiver to follow the received signal. This same error signal is fed to transmitter 12 by way of line 30 and when used to control the frequency of transmitter 12 ensures that the disrupting signal is on the correct frequency.

The original intelligence can be normally "copied" from the audio output of receiver 10, magnetic tape recorder 31 is included so that the received signals may be recorded.

The transmitter required can be either single side-band suppressed carrier (SSBSC) or CW. The SSBSC signal would be generated by a keyed audio tone with the center frequency of the suppressed carrier side stepped by the audio frequency, e.g. if a 1 KHz tone and upper side-band were used, the center frequency would be 1 Khz below the desired transmission frequency. For For disruption of MCW, the carrier would be reinserted, the center frequency would be at the disrupted frequency, and the MCW tone would be matched. The CW transmitter would be keyed as normally by the transmitter switch.

We claim is:

1. The method of selectively disrupting discrete keyed continuous wave radio communication wherein the discrete keyed continuous wave signal conveys intelligence by virtue of the duration and spacing of a coded series of characters comprising the step of receiving said discrete keyed continuous wave signals, the step of selectively inserting additional characters within the spaces between the characters of the original discrete keyed continuous wave signal, the step of selectively varying the width of said inserted characters, the step of inserting said additional characters in a random fashion, the step of transmitting said additional characters at the same frequency as said received signals, and the step of preventing said receiving during said transmitting.

2. A system for disrupting radio communications wherein the radio communications are in the form of pulses having spaces therebetween and disruptive pulses are inserted within the spaces comprising means with a separate antenna for receiving said pulses, said receiving means being normally on, means to detect and shape the received pulses, first one-shot multivibrator means receiving as an input said detected and shaped pulses and providing an output pulse in response to each of said input pulses, the trailing edge of said output pulse being delayed a predetermined time in respect to the trailing edge of said input pulse, variable capacitor means associated with said first one-shot multivibrator means to selectively vary said delay, said delay determining the time separation between the trailing edge of each received pulse and the leading edge of the disruptive pulse, second one-shot multivibrator means providing an output pulse in response to the trailing edge of the output pulse of said first one-shot multivibrator means, means to generate a random pulse, an AND gate receiving as one input said random pulse and another input said output pulse from said second one-shot multivibrator means, said AND gate providing an output pulse upon coincidence of the inputs thereto, first flip-flop multivibrator means triggered by the trailing edge of said output pulse from said AND gate to initiate an output pulse therefrom, receiver blanking means receiving said output pulse from said first flip-flop multivibrator means, said receiver blanking switch thereupon operating to turn off said receiving means, third one-shot multivibrator means also triggered by the trailing edge of said output pulse of said AND gate, second flip-flop multivibrator means receiving the output pulse from said third one-shot multivibrator and providing an output pulse in response thereto, a transmitter with a separate antenna tuned to the same frequency as said receiving means, said transmitter normally off, a transmitter keying switch operating to turn on said transmitter upon the reception of said output pulse from said second flip-flop multivibrator means, said transmitter being turned on after said receiving means is turned off, first means to reset said second flip-flop multivibrator means after a preselected time operating to turn off said transmitter, said first reset means receiving as an input the output pulse from said third one-shot multivibrator, and second means to reset said first flip-flop multivibrator means operating to turn on said receiving means after a preselected time, said second reset means also receiving as an input said output pulse of said third one-shot multivibrator, said transmitter being turned on after said receiving means turns off and said transmitter turning off after said receiver turns on.

3. A system for disrupting radio communication as described in claim 2 wherein said first reset means is comprised of fourth one-shot multivibrator means triggered by said output pulse of said AND gate, said fourth one-shot multivibrator means determining the width of the disrupting pulse, fifth one-shot multivibrator means triggered by the output pulse from said fourth one-shot multivibrator means, said fifth one-shot multivibrator means providing an output pulse to reset said second flip-flop multivibrator means.

4. A system for disrupting radio communications as described in claim 3 further including variable decade capacitor means associated with said fourth flip-flop multivibrator means for varying the width of the output pulse therefrom.

5. A system for disrupting radio communications as described in claim 2 wherein said second reset means is comprised of fourth, fifth and sixth one-shot multivibrator means connected in series with said fourth one-shot multivibrator means receiving as an input the output pulse of said third one-shot multivibrator means and with said sixth one-shot multivibrator means providing a reset pulse to said first flip-flop multivibrator means.

* * * * *